(12) United States Patent
Shi

(10) Patent No.: US 12,124,825 B2
(45) Date of Patent: Oct. 22, 2024

(54) METHOD AND APPARATUS FOR COMPATIBILITY DETECTION, DEVICE AND NON-TRANSITORY COMPUTER-READABLE STORAGE MEDIUM

(71) Applicant: INSPUR ELECTRONIC INFORMATION INDUSTRY CO., LTD., Shandong (CN)

(72) Inventor: Jing Shi, Shandong (CN)

(73) Assignee: INSPUR ELECTRONIC INFORMATION INDUSTRY CO., LTD., Shandong (CN)

( * ) Notice: Subject to any disclaimer, the term of this patent is extended or adjusted under 35 U.S.C. 154(b) by 0 days.

(21) Appl. No.: 18/247,176

(22) PCT Filed: Jul. 30, 2021

(86) PCT No.: PCT/CN2021/109428
§ 371 (c)(1),
(2) Date: Mar. 29, 2023

(87) PCT Pub. No.: WO2022/110863
PCT Pub. Date: Jun. 2, 2022

(65) Prior Publication Data
US 2024/0036841 A1    Feb. 1, 2024

(30) Foreign Application Priority Data
Nov. 26, 2020 (CN) .......................... 202011352516.4

(51) Int. Cl.
*G06F 8/41* (2018.01)
(52) U.S. Cl.
CPC .................... *G06F 8/437* (2013.01)
(58) Field of Classification Search
CPC ....................................................... G06F 8/71
(Continued)

(56) References Cited

U.S. PATENT DOCUMENTS 5,933,646 A * 8/1999 Hendrickson ............. G06F 8/71
717/169
7,284,190 B2 * 10/2007 Chellis .................. G06F 40/197
715/229
(Continued)

FOREIGN PATENT DOCUMENTS

CN     109446069 A  *  3/2019 .......... G06F 11/3664
CN     110543423 A     12/2019
(Continued)

OTHER PUBLICATIONS

NPL—English Translation for Foreign Patents (N-T).*
(Continued)

*Primary Examiner* — Francisco J Aponte
(74) *Attorney, Agent, or Firm* — Dennemeyer & Associates LLC; Victoria Friedman

(57) ABSTRACT

A method and an apparatus for compatibility detection, a device and a non-transitory computer-readable storage medium. The method includes: a dependency form of an application system and dependency libraries of each of operating systems are acquired; compatibility matching detection is respectively performed on the dependency form and each of the dependency libraries, so as to obtain matching forms corresponding to each of the operating systems; by the matching forms, the operating systems are divided into first operating systems which are in dependency compatibility with the application system, and second operating systems which are not in dependency compatibility with the application system; it is determined that the application system is not compatible with the second operating system; and a compatibility white box test is performed on the first operating system, so as to obtain a compatibility result, which indicates whether the application system is compatible with the first operating system.

16 Claims, 4 Drawing Sheets

(58) Field of Classification Search
USPC .......................................................... 717/141
See application file for complete search history.

(56) References Cited

U.S. PATENT DOCUMENTS

| | | | | |
|---|---|---|---|---|
| 8,875,160 B2* | 10/2014 | Hunt | ........................ | G06F 8/71 |
| | | | | 718/1 |
| 9,015,702 B2* | 4/2015 | Bhat | ................... | G06F 9/44552 |
| | | | | 717/170 |
| 9,183,120 B1* | 11/2015 | Webb | ........................ | G06F 8/76 |
| 9,645,815 B2* | 5/2017 | Bennah | ............... | G06F 11/3051 |
| 9,830,146 B2* | 11/2017 | Rector | ...................... | G06F 8/71 |
| 9,891,939 B2* | 2/2018 | Hunt | ................... | G06F 9/45558 |
| 9,921,827 B1* | 3/2018 | Evans | ................. | G06F 9/44536 |
| 10,346,457 B2* | 7/2019 | Singhal | ................. | G06F 16/353 |
| 10,705,831 B2* | 7/2020 | Mahajan | ................ | H04L 67/10 |
| 10,951,459 B2* | 3/2021 | Hillier | .................. | H04L 41/022 |
| 11,216,299 B1* | 1/2022 | Borsa | .................. | G06F 9/4555 |
| 2009/0265701 A1* | 10/2009 | Naslavsky | ................ | G06F 8/61 |
| | | | | 717/172 |
| 2012/0222025 A1* | 8/2012 | Pandit | .................... | G06F 8/658 |
| | | | | 717/170 |
| 2016/0170775 A1* | 6/2016 | Rockwell | ............ | G06F 13/4282 |
| | | | | 713/100 |
| 2018/0025160 A1 | 1/2018 | Hwang et al. | | |
| 2023/0049741 A1* | 2/2023 | Liu | ........................... | G06F 8/71 |
| 2023/0367724 A1* | 11/2023 | Patel | ................ | G06Q 10/06312 |

FOREIGN PATENT DOCUMENTS

| | | | | |
|---|---|---|---|---|
| CN | 111414189 A | | | 7/2020 |
| CN | 112328494 A | | | 2/2021 |
| CN | 114691188 A | * | | 7/2022 |
| CN | 114691440 A | * | | 7/2022 |
| CN | 115167882 A | * | | 10/2022 |
| CN | 115202687 A | * | | 10/2022 |
| CN | 115757092 A | * | | 3/2023 |
| CN | 110716874 B | * | | 8/2023 |
| CN | 110716873 B | * | | 9/2023 |

OTHER PUBLICATIONS

Foreign Patent Document: Text Translation.*
Search report for International Application No. PCT/CN2021/109428 mailed on Sep. 29, 2021.
Search report for Chinese application 202011352516.4 filed Nov. 26, 2020.

* cited by examiner

METHOD AND APPARATUS FOR COMPATIBILITY DETECTION, DEVICE AND NON-TRANSITORY COMPUTER-READABLE STORAGE MEDIUM

TECHNICAL FIELD

The present application relates to the technical field of computer applications, and in particular, to a method and an apparatus for compatibility detection, a device, and a non-transitory computer-readable storage medium.

BACKGROUND

For a business application system running on a server hardware platform and an operating system platform, before being formally published online, a compatibility detection needs to be performed on a running platform environment that may be deployed. Therefore, an incompatibility situation appearing in the test is modified on the basis of a test result, so as to ensure that the function requirements of the application system meet design requirements.

In order to ensure that the test result is real and reliable to the greatest extent, all modules in the application system need to be tested one by one for all operating system platforms of different brands and different versions on which the application system may run, that is, a white box test is performed. Thus, the test scale is proportional to the scale of functional modules and the number of operating system platforms. That is to say, when there are many modules of the application system and there are many operating system versions that need to be adapted, the workload of the compatibility detection is huge, a large amount of manpower and material resources need to be input, and the entire test process may only be completed within a relatively long time.

In summary, how to effectively solve the problems of compatibility detection and the like of the application system is a technical problem to be urgently solved by those skilled in the art at present.

SUMMARY

The objective of the present application is to provide a method and an apparatus for compatibility detection, a device, and a non-transitory computer-readable storage medium.

The present application provides the following technical solutions:

An method for compatibility detection for an application system, includes:
  a dependency form of an application system and dependency libraries of each of a plurality of operating systems are acquired;
  compatibility matching detection is respectively performed on the dependency form and each of the dependency libraries, so as to obtain matching forms corresponding to each of the plurality of the operating systems;
  by means of the matching forms, the plurality of the operating systems are divided into first operating systems which are in dependency compatibility with the application system, and second operating systems which are not in dependency compatibility with the application system;
  it is determined that the application system is not compatible with the second operating system; and a compatibility white box test is performed on the first operating system, so as to obtain a compatibility result, which indicates whether the application system is compatible with the first operating system.

In some embodiments, the dependency form of the application system and the dependency libraries of each of the plurality of the operating systems are acquired includes:
  the application system is analyzed by a dependency analysis tool, so as to obtain the dependency form; and
  the dependency library of each of the of the plurality of the operating systems is respectively extracted.

In some embodiments, by means of the matching forms, the plurality of the operating systems are divided into the first operating systems which are in dependency compatibility with the application system, and the second operating systems which are not in dependency compatibility with the application system includes:
  the number of dependency matching items of each of the matching forms is counted; and
  the plurality of the operating systems are divided into the first operating systems and the second operating systems by means of the number of the dependency matching items.

In some embodiments, the plurality of the operating systems are divided into the first operating systems and the second operating systems by means of the number of the dependency matching items includes:
  the number of the dependency matching items is divided by a total number of dependency items of the dependency form, so as to obtain a compatibility coefficient;
  it is determined, to be the first operating system, an operating system of which the compatibility coefficient is greater than a compatibility threshold value; and
  it is determined, to be the second operating system, an operating system of which the compatibility coefficient is not greater than the compatibility threshold value.

In some embodiments, the plurality of the operating systems are divided into the first operating systems and the second operating systems by means of the number of the dependency matching items includes:
  the plurality of the operating systems are sorted in a descending order of numbers of the dependency matching items; and
  it is determined, to be the first operating systems, a specified number of operating systems at a head of a queue, and it is determined, to be the second operating systems, operating systems excluding the specified number of the operating systems at the head of the queue.

In some embodiments, the method further includes:
  a compatibility report of the application system is constructed, and in the compatibility report, mark information indicating whether the application system is compatible with each of the of the plurality of the operating systems is respectively recorded.

In some embodiments, the compatibility matching detection is respectively performed on the dependency form and each of the dependency libraries, so as to obtain the matching forms corresponding to each of the operating systems includes:
  a dependency package which is corresponding is searched from the dependency library of each of the plurality of the operating systems according to a dependency name in the dependency form;
  in a case that a type of a dependency is the same as a type of the dependency package, and the dependency is within a compatible version range of the dependency package, it is determined that the dependency is compatible with and matches the dependency package; and in the matching form, compatibility matching information between the dependency and each dependency package are correspondingly recorded.

An apparatus for compatibility detection, including:

a dependency acquisition module, configured to acquire a dependency form of an application system and dependency libraries of each of a plurality of operating systems;

a dependency matching detection module, configured to respectively perform compatibility matching detection on the dependency form and each of the dependency libraries, so as to obtain matching forms corresponding to each of the plurality of the operating systems;

an operating system classification module, configured to divide, by means of the matching forms, the plurality of the operating systems into first operating systems which are in dependency compatibility with the application system, and second operating systems which are not in dependency compatibility with the application system;

a compatibility determination module, configured to determine that the application system is not compatible with the second operating system; and a compatibility detection module, configured to perform a compatibility white box test on the first operating system, so as to obtain a compatibility result, which indicates whether the application system is compatible with the first operating system.

An electronic device, including:

a memory, used for storing a computer program; and a processor, used for implementing the steps of the above method for compatibility detection when executing the computer program.

A non-transitory computer-readable storage medium, and a computer program is stored on the non-transitory computer-readable storage medium, and when executed by a processor, the computer program implements steps of the above method for compatibility detection.

Correspondingly, the embodiments of the present application further provide an apparatus for compatibility detection corresponding to the method for compatibility detection, a device, and a non-transitory computer-readable storage medium.

BRIEF DESCRIPTION OF THE DRAWINGS

To illustrate technical solutions in the embodiments of the present application or in the prior art more clearly, a brief introduction on the drawings which are needed in the description of the embodiments or related arts is given below. Apparently, the drawings in the description below are merely some of the embodiments of the present application, based on which other drawings may be obtained by those ordinary skilled in the art without any creative effort.

DETAILED DESCRIPTION OF THE EMBODIMENTS

The core of the present application is to provide a method for compatibility detection, so as to solve the problems in a traditional compatibility detection of an application system and an operating system platform that the workload is huge, a large number of manpower and material resource inputs are required, and that the entire test process may only be completed within a relatively long time. In the embodiments of the present application, the number of operating systems which participate in a white box test is reduced by dependency matching detection, such that the test scale is effectively reduced on the premise of ensuring the test effect, and the manpower and material resource costs and the test risks of an application system enterprise are reduced. It is conducive to improve the compatibility and the stability of a large-scale application system to a wide variety of operating platform environment, and especially to operating system platforms with faster version update, which is beneficial for the application system to be deployed and published to wider scenarios.

Another core of the present application is to provide an apparatus for compatibility detection corresponding to the method for compatibility detection, a device, and a non-transitory computer-readable storage medium, which have the above technical effects, and thus details are not described herein again.

In order that those skilled in the art may better understand the solutions of the present application, the present application will be further described in detail below in combination with the drawings and specific embodiments. Apparently, the embodiments described below are merely a part, but not all, of the embodiments of the present application. All of other embodiments, obtained by those ordinary skilled in the art based on the embodiments of the present application without any creative effort, fall into the protection scope of the present application.

Figure 1:
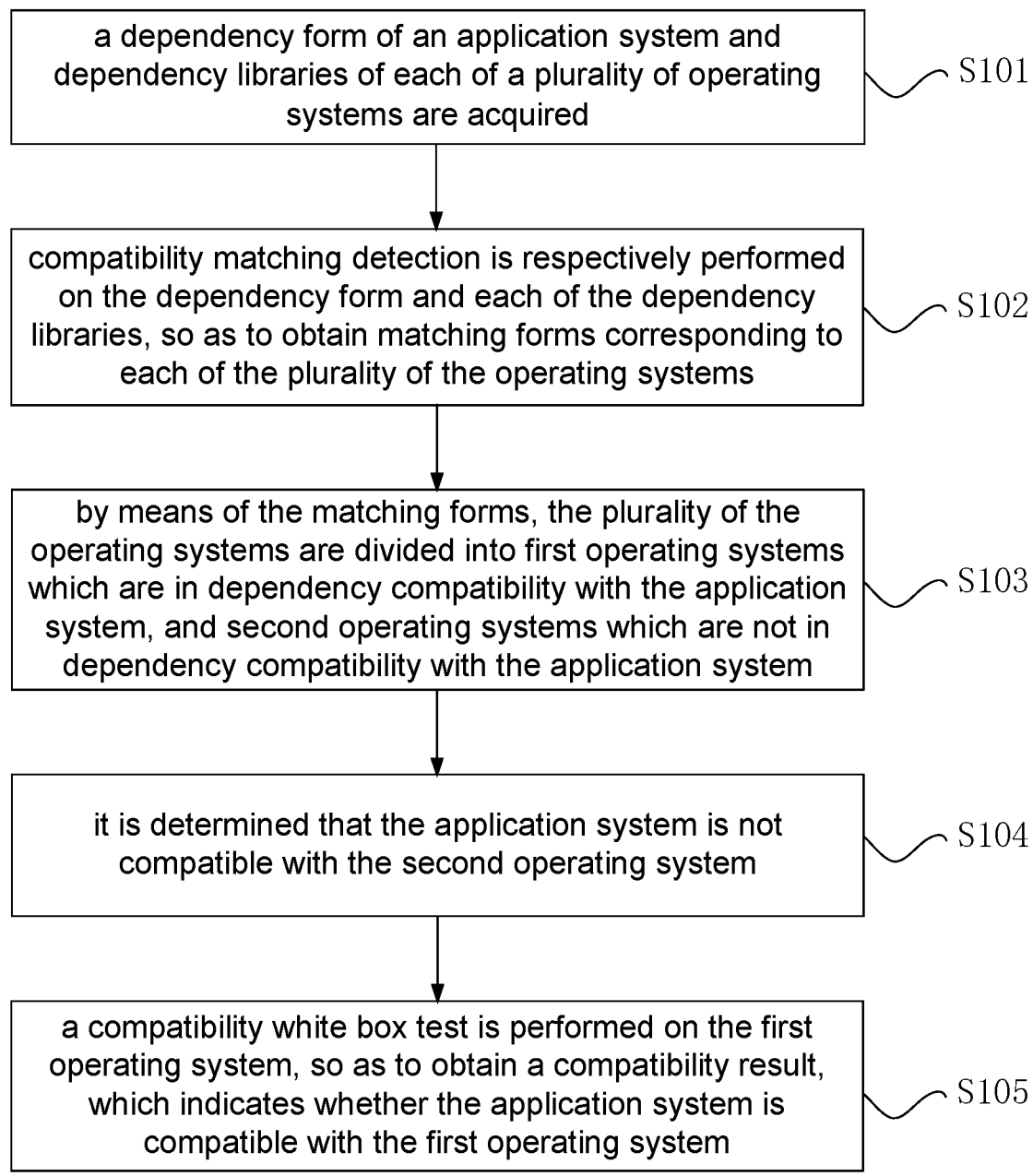
FIG. 1 is an implementation flow diagram of a method for compatibility detection in an embodiment of present application.
Figure 2:
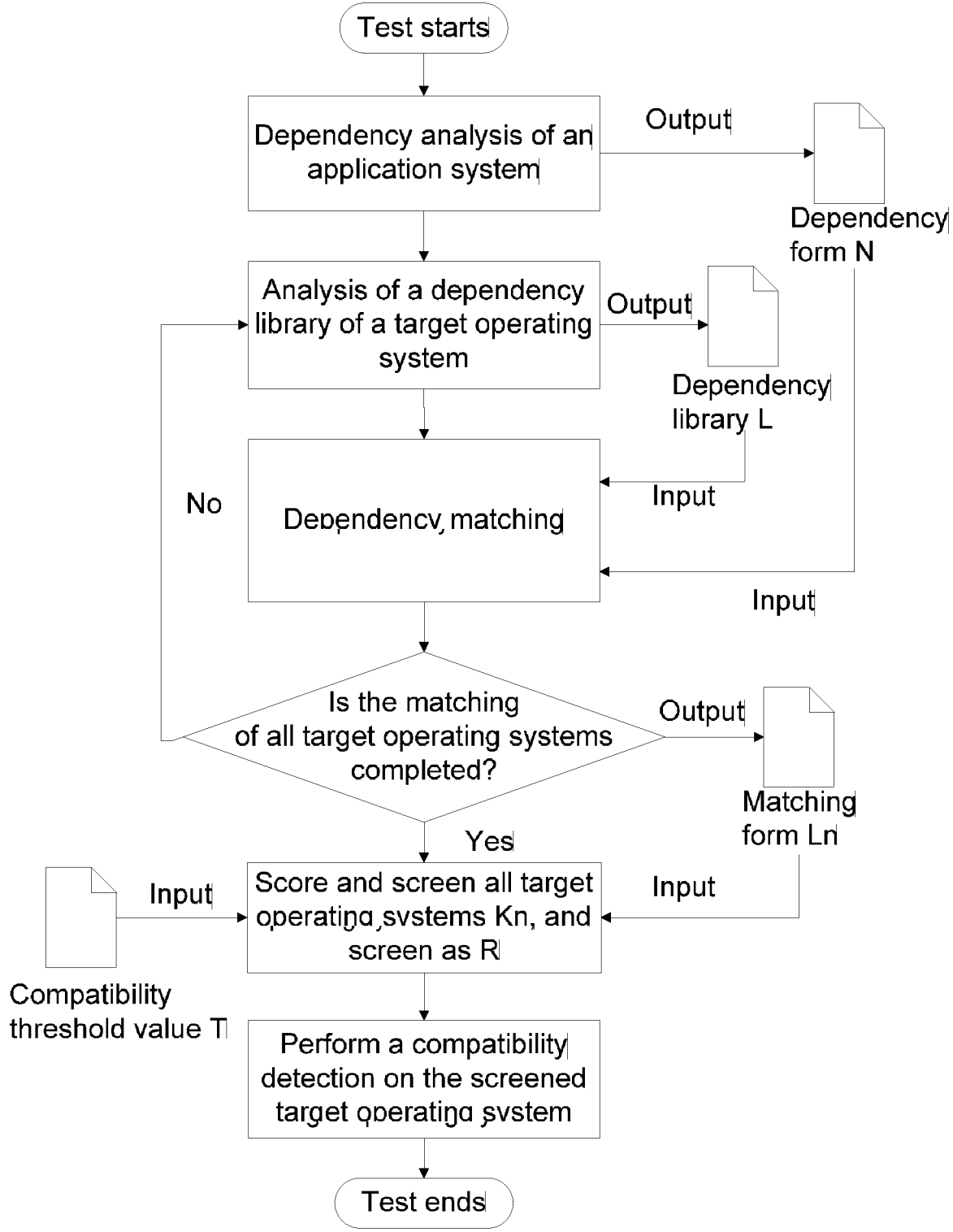
FIG. 2 is a specific implementation flow diagram of a method for compatibility detection in an embodiment of present application.

Please refer to FIG. 1 and FIG. 2, FIG. 1 is a flow diagram of a method for compatibility detection in an embodiment of present application, and FIG. 2 is a specific implementation flow diagram of a method for compatibility detection in an embodiment of present application. The method includes the following steps:

S101, a dependency form of an application system and dependency libraries of each of a plurality of operating systems are acquired.

The application system may be any system, which needs to perform a compatibility detection on an operating system or a server application platform. In the present embodiment, specific functions, architecture, scale and the like of the application system are not limited.

The dependency form may be used for recording all dependency information of the application system, and the dependency information includes a name, a type and a version. In order to facilitate the subsequent description, in the present embodiment, a statistical value of the number of dependency items in the dependency form is denoted as N.

For the operating system, the dependency library which is corresponding is included therein. In the present embodiment, the dependency library which is corresponding specifically includes which dependency packages, the number of the dependency packages and the like are not limited.

In the present embodiment, the dependency form of the application system may be stored in a non-transitory computer-readable storage medium in advance, so that the dependency form can be obtained by means of reading; the dependency form may also be obtained by means of receiving data information sent by an external device; and the dependency form may also be obtained by means of directly analyzing the application system. Correspondingly, the dependency library of the operating system may also be stored in the non-transitory computer-readable storage medium in advance, so that the dependency library is obtained by means of reading; the dependency library may also be obtained by means of receiving the data information sent by the external device; and the dependency library may also be directly extracted from the operating system.

In some embodiments of the present application, the step S101: acquiring the dependency form of the application system and the dependency libraries of each of the plurality of the operating systems, includes:

step 1, the application system is analyzed by a dependency analysis tool, so as to obtain the dependency form; and step 2, the dependency library of each of the plurality of the operating systems is respectively extracted.

In the embodiments of the present application, the specific type, the implementation principle and the like of the dependency analysis tool are not limited, that is, as long as the application system is analyzed according to the dependency analysis tool, so as to obtain the dependency form. The specific implementation of extracting the dependency library of each of the plurality of the operating systems may also refer to the implementation process of extracting the dependency library, and thus will not be repeated herein one by one.

S102, compatibility matching detection is respectively performed on the dependency form and each of the dependency libraries, so as to obtain matching forms corresponding to each of the plurality of the operating systems.

After the dependency form of the application system and the dependency libraries of each of the plurality of the operating systems are obtained, it may be judged on the basis of the dependency form and the dependency libraries that whether the application system is dependency compatible with and matches each of the plurality of the operating systems.

It is detected whether the dependency form is compatible with and matches the dependency library, that is, it is judged whether each dependency in the form may find a corresponding dependency package in the dependency library, and a judgment result is counted, so that the matching form of each the operating system is formed.

In some embodiments of the present application, the step S102: respectively performing the compatibility matching detection on the dependency form and each of the dependency libraries, so as to obtain the matching forms corresponding to each of the plurality of the operating systems, includes:

step 1, a dependency package which is corresponding is searched from the dependency library of each of the plurality of the operating systems according to a dependency name in the dependency form;

step 2, in a case that a type of a dependency is the same as a type of the dependency package, and the dependency is within a compatible version range of the dependency package, it is determined that the dependency is compatible with and matches the dependency package; and step 3, in the matching form, compatibility matching information between the dependency and each the dependency package is correspondingly recorded.

For ease of description, the above three steps are combined to be described below.

For a dependency aN in the dependency form, firstly, a corresponding dependency package aL is searched from the dependency library of the operating system according to the dependency name; and then, the dependency and dependency package are judged, and if both the following two conditions are met, it is judged that the dependency aN is compatible with and matches the dependency package aL.

Condition 1, the type of the dependency aN is the same as the type of the dependency package aL; and condition 2, the version of the dependency aN is within a downward and upward compatible version range corresponding to the dependency package aL.

After the dependency compatibility matching detection of the current operating system is completed, the matching detection situation corresponding to each the dependency is recorded in the matching form; and then, the analysis and matching of the dependency library of the next operating system are performed, until the analysis and matching of the dependency libraries of all first operating system platforms are completed.

S103, by means of the matching forms, the plurality of the operating systems are divided into first operating systems which are in dependency compatibility with the application system, and second operating systems which are not in dependency compatibility with the application system.

After the matching form is obtained, the operating systems may be divided according to the dependency compatibility matching situations recorded in the matching forms, that is, the operating systems are divided into the first operating systems which are in dependency compatibility with the application system, and the second operating systems which are not in dependency compatibility with the application system.

It should be noted that in the embodiments of the present application, first and second in the first operating system and the second operating system are only used to distinguish different dependency compatibility situations, but do not refer to that the operating systems have differences in sequence, priority, etc.

In some embodiments, when the type of the operating system is divided, type division may be performed on the operating system on the basis of the dependency compatibility matching situations recorded in the matching form, such as the number, the ratio and the like.

In some embodiments of the present application, the step S103: dividing, by means of the matching forms, the plurality of the operating systems into the first operating systems which are in dependency compatibility with the application system, and the second operating systems which are not in dependency compatibility with the application system, specifically includes:

step 1, the number of dependency matching items of each of the matching forms is counted; and step 2, the plurality of the operating systems are divided into the first operating systems and the second operating systems by means of the number of the dependency matching items.

For ease of description, the above two steps are combined to be described below.

Firstly, the number of the dependency matching items in the matching form is counted. Obviously, the greater the number of the dependency matching items is, it indicates that the application system is more compatible with and matches the operating system. Therefore, there are many ways to perform division on the basis of the number of the dependency matching items, and any one may be selected in practical applications.

Division manner 1: the division is performed on the basis of a compatibility ratio, and the specific implementation process includes:

Step 2.1.1, the number of the dependency matching items is divided by a total number of dependency items of the dependency form, so as to obtain a compatibility coefficient;

step 2.1.2, it is determined, to be the first operating system, an operating system of which the compatibility coefficient is greater than a compatibility threshold value; and step 2.1.3, it is determined, to be the second operating system, an operating system of which the compatibility coefficient is not greater than the compatibility threshold value.

That is to say, all of compatibility coefficients K of the operating systems are solved. The calculation formula is as follows: $Kn=Ln/N$, ($n=1, 2, 3 \ldots$), and n represents different tested operating systems.

That is, the value of Kn is between 0 and 1, and all Kn may be positively sorted to form a sequence. Then, a compatibility threshold value T is set for the currently tested application system, and $0<T<1$; and T is used for screening out an operating system, which has excessively low compatibility and thus has no adaption value. In some embodiments, T may be set between 0.5 and 0.7, so that all first operating systems are systems that are incompatible with the application system, and the number of the second operating systems is reduced.

The Kn sequence is truncated by T, that is, the truncated KN>T, and the sequence is stored as a list R of screened operating systems. All n operating systems corresponding to all Kn values contained in the list R, and the list R forms an operating system platform set of which the screened compatibility meets T, and the operating systems in the operating system platform set are the first operating systems. The operating systems beyond the operating system platform set are the second operating systems.

Manner 2: the operating systems are classified on the basis of number sorting, and the specific implementation process includes:

step 2.2.1, the plurality of the operating systems are sorted in a descending order of numbers of the dependency matching items; and step 2.2.2, it is determined, to be the first operating systems, a specified number of operating systems at a head of a queue, and determining, to be the second operating systems, operating systems excluding the specified number of the operating systems at the head of the queue.

In this manner, it is necessary to set, in advance, the number of first operating systems that need to enter the white box test, and then the sorting is performed according to the number of the dependency matching items, that is, the specified number of first operating systems with optimal compatibility matching may be selected.

It should be noted that, in practical applications, the operating systems may also be classified in other manners, that is, the classification principle is that the greater the number of the dependency matching items is, the greater the possibility of becoming the first operating system is; and otherwise, the greater the possibility of becoming the second operating system is.

S104, it is determined that the application system is not compatible with the second operating system.

Since the compatibility detection process is based on the white box test, and the target range of a functional test of system modules has been designed, basic function dependency at a code level is generally provided by calling the dependency library of an operating environment of the operating system. Therefore, after the classification of the operating systems is completed, it may be directly determined that the application system is not compatible with the second operating system.

S105, a compatibility white box test is performed on the first operating system, so as to obtain a compatibility result, which indicates whether the application system is compatible with the first operating system.

The first operating system, that is, an operating system which passes a dependency compatibility matching test, is further performed on the compatibility white box test to determine whether the application system is compatible with the first operating system.

That is to say, an operating system that fails in dependency compatibility matching is absolutely an operating system, which is not compatible with the application system; and an operating system that succeeds in dependency compatibility matching may be an operating system, which is compatible with the application system or not, and thus the compatibility detection needs to be further performed on the operating system.

In the embodiments of the present application, specific test procedures, details, principles and the like of the compatibility white box test are not limited.

It should be noted that, in practical applications, there is no sequence between the steps S104 and S105, that is, S105 may be executed at first and then S104 is executed, and S104 and S105 may also be executed in parallel.

When the application system is modified to serve as a new version to adapt to the same operating system list, the analysis result of the dependency library of the operating system may be reused, and the dependency library is directly matched, so that the efficiency is further improved.

In some embodiments of the present application, a compatibility report of the application system may also be constructed, and mark information indicating whether the application system is compatible with each of the plurality of the operating systems, that is, the compatibility matching situation of the application system to each of the plurality of the operating systems, is respectively recorded in the compatibility report.

By the method provided in the embodiments of the present application, the dependency form of the application system and the dependency libraries of each of the plurality of the operating systems are acquired; the compatibility matching detection is respectively performed on the dependency form and each of the dependency libraries, so as to obtain the matching forms corresponding to each of the plurality of the operating systems; by means of the matching forms, the plurality of the operating systems are divided into the first operating systems which are in dependency compatibility with the application system, and the second operating systems which are not in dependency compatibility with the application system; it is determined that the application system is not compatible with the second operating system; and the compatibility white box test is performed on the first operating system, so as to obtain the compatibility result, which indicates whether the application system is compatible with the first operating system.

Since the compatibility detection process is based on the white box test, and the target range of a functional test of system modules has been designed, basic function dependency at a code level is generally provided by calling the dependency library of an operating environment of the operating system. Therefore, the compatibility of module functions in the application system on the call dependency of the dependency library can be used as a concise index for evaluating whether the module functions of the application system are adapted to the current operating system. Through this index, multi-platform compatibility detection tasks can be evaluated and screened, thereby reducing the test scale, and improving the working efficiency.

Specifically, the dependency form of the application system and the dependency libraries of each of the plurality of the operating systems are acquired at first. Then, the compatibility matching detection is respectively performed on the dependency form and each of the dependency libraries, so as to obtain the matching forms corresponding to each of the plurality of the operating systems. By means of the matching form, it is possible to clearly obtain the first operating systems which are in dependency compatibility with the application system, and the second operating systems which are not in dependency compatibility with the application system. The second operating systems which are not in dependency compatibility with the application system are directly determined, and then the compatibility white box test is performed on the first operating systems, so as to obtain the compatibility result, which indicates whether the application system is compatible with the first operating systems. In this way, the number of the operating systems which participate in white box test can be reduced, and the compatibility detection efficiency of the application system can be effectively improved.

Corresponding to the above method embodiments, the embodiments of the present application further provide an apparatus for compatibility detection, and the apparatus for compatibility detection described below and the method for compatibility detection described above may correspond to each other.

Figure 3:
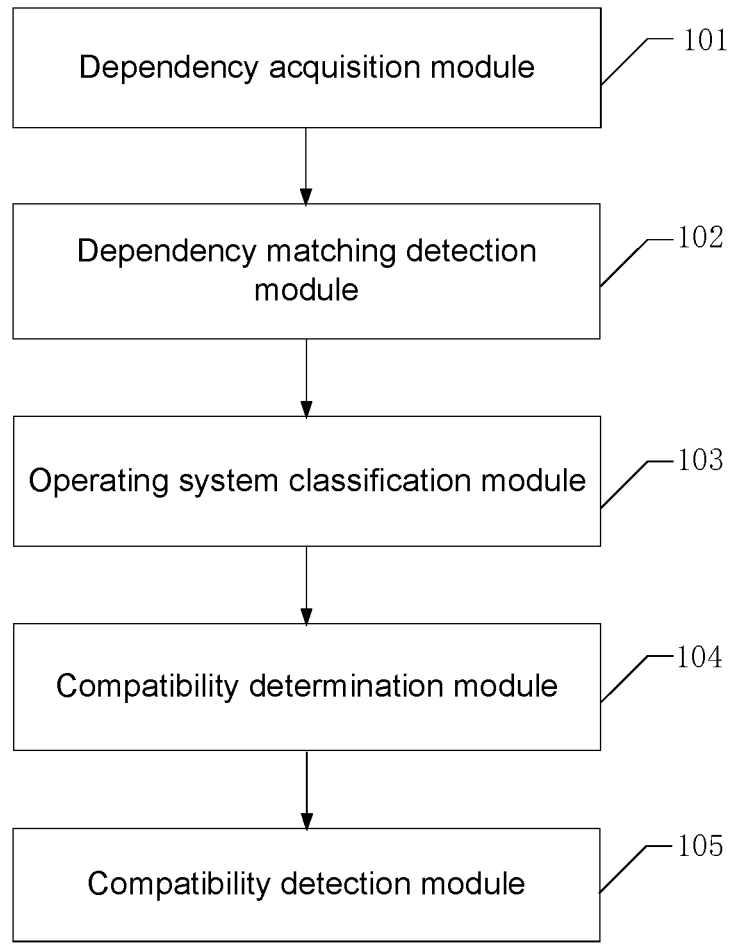
FIG. 3 is a schematic structural diagram of an apparatus for compatibility detection in an embodiment of present application.

As shown in FIG. 3, the apparatus includes the following modules:

a dependency acquisition module 101, configured to acquire a dependency form of an application system and dependency libraries of each of a plurality of operating systems;

a dependency matching detection module 102, configured to respectively perform compatibility matching detection on the dependency form and each of the dependency libraries, so as to obtain a matching form corresponding to each of the plurality of the operating systems;

an operating system classification module 103, configured to divide, by means of the matching form, the plurality of the operating systems into first operating systems which are in dependency compatibility with the application system, and second operating systems which are not in dependency compatibility with the application system;

a compatibility determination module 104, configured to determine that the application system is not compatible with the second operating system; and a compatibility detection module 105, configured to perform a compatibility white box test on the first operating system, so as to obtain a compatibility result, which indicates whether the application system is compatible with the first operating system.

By the apparatus provided in the embodiments of the present application, the dependency form of the application system and the dependency libraries of each of the plurality of the operating systems are acquired; the compatibility matching detection is respectively performed on the dependency form and each of the plurality of the dependency libraries, so as to obtain the matching forms corresponding to each of the plurality of the operating systems; by means of the matching forms, the plurality of the operating systems are divided into the first operating systems which are in dependency compatibility with the application system, and the second operating systems which are not in dependency compatibility with the application system; it is determined that the application system is not compatible with the second operating system; and the compatibility white box test is performed on the first operating system, so as to obtain the compatibility result, which indicates whether the application system is compatible with the first operating system.

Since the compatibility detection process is based on the white box test, and the target range of a functional test of system modules has been designed, basic function dependency at a code level is generally provided by calling the dependency library of an operating environment of the operating system. Therefore, the compatibility of module functions in the application system on the call dependency of the dependency library can be used as a concise index for evaluating whether the module functions of the application system are adapted to the current operating system. Through this index, multi-platform compatibility detection tasks can be evaluated and screened, thereby reducing the test scale, and improving the working efficiency.

Specifically, the dependency form of the application system and the dependency libraries of each of the plurality of the operating systems are acquired at first. Then, the compatibility matching detection is respectively performed on the dependency form and each of the dependency libraries, so as to obtain the matching forms corresponding to each of the plurality of the operating systems. By means of the matching form, it is possible to clearly obtain the first operating systems which are in dependency compatibility with the application system, and the second operating systems which are not in dependency compatibility with the application system. The second operating systems which are not in dependency compatibility with the application system are directly determined, and then the compatibility white box test is performed on the first operating systems, so as to obtain the compatibility result, which indicates whether the application system is compatible with the first operating systems. In this way, the number of the operating systems which participate in white box test can be reduced, and the compatibility detection efficiency of the application system can be effectively improved.

In some embodiments of the present application, the dependency acquisition module 101 is specifically configured to analyze the application system by a dependency analysis tool, so as to obtain the dependency form; and respectively extract the dependency library of each of the plurality of the operating systems.

In some embodiments of the present application, the operating system classification module 103 is specifically configured to count the number of dependency matching items of each of the matching forms; and divide the plurality of the operating systems into the first operating systems and the second operating systems by means of the number of the dependency matching items.

In some embodiments of the present application, the operating system classification module 103 is specifically configured to divide the number of the dependency matching items by a total number of dependency items of the dependency form, so as to obtain a compatibility coefficient; determine, to be the first operating system, an operating system of which the compatibility coefficient is greater than a compatibility threshold value; and determine, to be the second operating system, an operating system of which the compatibility coefficient is not greater than the compatibility threshold value.

In some embodiments of the present application, the operating system classification module 103 is specifically configured to sort the plurality of the operating systems in a descending order of numbers of the dependency matching items; and determine, to be the first operating systems, a specified number of operating systems at a head of a queue, and determine, to be the second operating systems, operating systems excluding the specified number of the operating systems at the head of the queue.

In some embodiments of the present application, the apparatus further includes:
a compatibility report construction module, configured to construct a compatibility report of the application system, and respectively record, in the compatibility report, mark information indicating whether the application system is compatible with each of the of the plurality of the operating systems.

In some embodiments of the present application, the dependency matching detection module 102 is specifically configured to search a dependency package which is corresponding from the dependency library of each of the plurality of the operating systems according to a dependency name in the dependency form; in a case that a type of a dependency is the same as a type of the dependency package, and the dependency is within a compatible version range of the dependency package, determine that the dependency is compatible with and matches the dependency package; and correspondingly record, in the matching form, compatibility matching information between the dependency and each the dependency package.

Corresponding to the above method embodiments, the embodiments of the present application further provide an electronic device, and the electronic device described below and the method for compatibility detection described above may correspond to each other.

Figure 4:
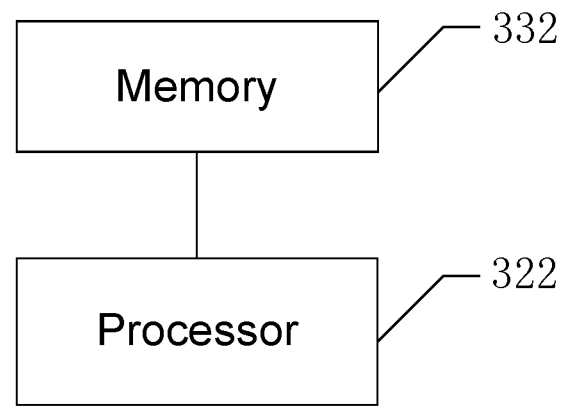
FIG. 4 is a schematic structural diagram of an electronic device in an embodiment of present application.

Referring to FIG. 4, the electronic device includes:
a memory 332, used for storing a computer program; and
a processor 322, used for implementing steps of the method for compatibility detection in the above method embodiments when executing the computer program.

Figure 5:
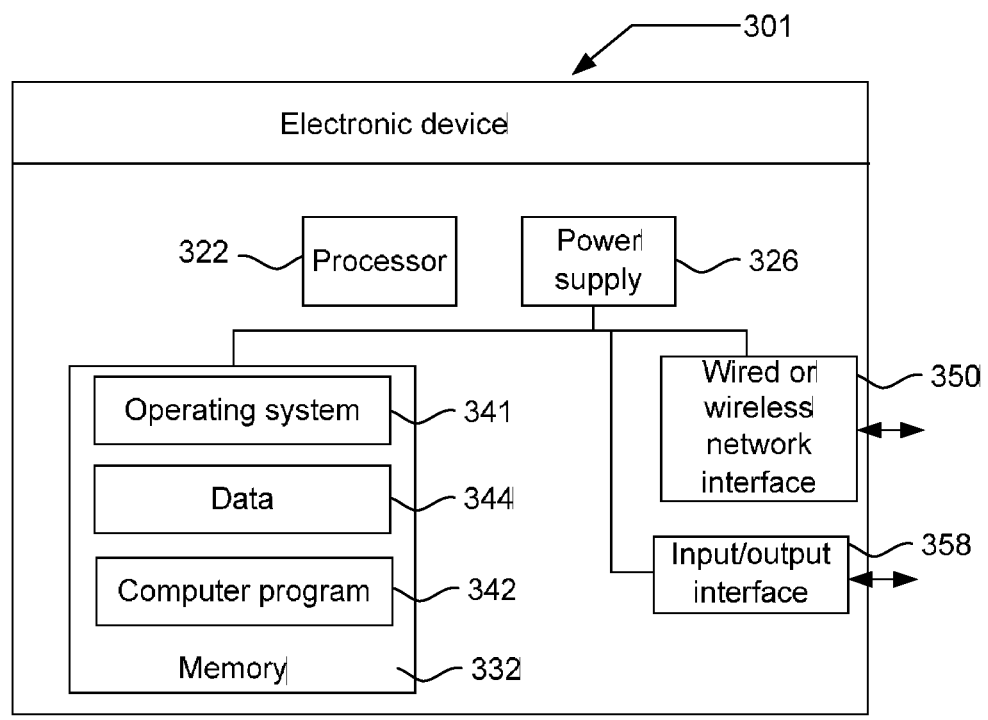
FIG. 5 is a schematic diagram of a specific structure of an electronic device in an embodiment of present application.

In some embodiments, please refer to FIG. 5, FIG. 5 is a schematic diagram of a specific structure of an electronic device in an embodiment of present application, the electronic device may generate a relatively large difference due to different configurations or performances, and may include one or more central processing units (central processing units, CPUs) 322 (e.g., one or more processors) and a memory 332, and the memory 332 stores one or more computer application programs 342 or data 344, and the memory 332 may be a temporary memory or a persistent memory. The program stored in the memory 332 may include one or more modules (not shown), and each module may include a series of instruction operations in a data processing device. Further, the central processing unit 322 may be configured to communicate with the memory 332, so as to execute, on an electronic device 301, a series of instruction operations in the memory 332.

The electronic device 301 may further include one or more power supplies 326, one or more wired or wireless network interfaces 350, one or more input/output interfaces 358, and/or, one or more operating systems 341.

The steps in the method for compatibility detection described above may be implemented by the structure of the electronic device.

Corresponding to the above method embodiments, the embodiments of the present application further provide a non-transitory computer-readable storage medium, and the non-transitory computer-readable storage medium described below and the method for compatibility detection described above may correspond to each other.

A non-transitory computer-readable storage medium, and a computer program is stored on the non-transitory computer-readable storage medium, and when executed by a processor, the computer program implements the steps of the method for compatibility detection in the above method embodiments.

The non-transitory computer-readable storage medium may be specifically various readable storage media capable of storing program codes, such as a USB flash disk, a mobile hard disk, a read-only memory (Read-Only Memory, ROM), a random access memory (Random Access Memory, RAM), a magnetic disk, or an optical disk, etc.

Those skilled in the art may further realize that, the units and algorithm steps of various examples described in connection with the embodiments disclosed herein may be implemented by electronic hardware, computer software, or a combination thereof, and in order to clearly illustrate the interchangeability of hardware and software, the components and steps of the various examples have been generally described in the above description according to functions. Whether these functions are executed by hardware or software depends on specific applications and design constraint conditions of the technical solutions. Those skilled in the art may use different methods to implement the described functions for each particular application, but this implementation should not be considered as exceeding the scope of the present application.

What is claimed is:

1. A method for compatibility detection, comprising:
acquiring a dependency form of an application system and dependency libraries of each of a plurality of operating systems;
respectively performing compatibility matching detection on the dependency form and each of the dependency libraries, so as to obtain matching forms corresponding to each of the plurality of the operating systems;
dividing, by means of the matching forms, the plurality of the operating systems into first operating systems which are in dependency compatibility with the application system, and second operating systems which are not in dependency compatibility with the application system;
determining that the application system is not compatible with the second operating system; and
performing a compatibility white box test on the first operating system, so as to obtain a compatibility result, which indicates whether the application system is compatible with the first operating system,
wherein dividing, by means of the matching forms, the plurality of the operating systems into the first operating systems which are in dependency compatibility with the application system, and the second operating systems which are not in dependency compatibility with the application system comprises:
  counting the number of dependency matching items of each the matching forms; and
  dividing the plurality of the operating systems into the first operating systems and the second operating systems by means of the number of the dependency matching items,
  wherein dividing the plurality of the operating systems into the first operating systems and the second operating systems by means of the number of the dependency matching items comprises:
  dividing the number of the dependency matching items by a total number of dependency items of the dependency form, so as to obtain a compatibility coefficient;
  determining to be the first operating system, an operating system of which the compatibility coefficient is greater than a compatibility threshold value; and
  determining, to be the second operating system, an operating system of which the compatibility coefficient is not greater than the compatibility threshold value,
  wherein dividing the plurality of the operating systems into the first operating systems and the second operating systems by means of the number of the dependency matching items comprises:
  sorting the plurality of the operating systems in a descending order of numbers of the dependency matching items; and
  determining to be the first operating systems, a specified number of operating systems at a head of a queue, and determining, to be the second operating systems, operating systems excluding the specified number of the operating systems at the head of the queue.

2. The method for compatibility detection according to claim 1, wherein acquiring the dependency form of the application system and the dependency libraries of each of the plurality of the operating systems comprises:
  analyzing the application system by a dependency analysis tool, so as to obtain the dependency form; and
  respectively extracting the dependency library of each of the plurality of the operating systems.

3. The method for compatibility detection according to claim 1, further comprising:
  constructing a compatibility report of the application system, and respectively recording, in the compatibility report, mark information indicating whether the application system is compatible with each of the of the plurality of the operating systems.

4. The method for compatibility detection according to claim 1, wherein respectively performing the compatibility matching detection on the dependency form and each of the dependency libraries, so as to obtain the matching forms corresponding to each of the plurality of the operating systems, comprises:
  searching a dependency package which is corresponding from the dependency library of each of the plurality of the operating systems according to a dependency name in the dependency form;
  in a case that a type of a dependency is the same as a type of the dependency package, and the dependency is within a compatible version range of the dependency package, determining that the dependency is compatible with and matches the dependency package; and
  correspondingly recording, in the matching form, compatible matching information between the dependency and each the dependency package.

5. The method for compatibility detection according to claim 1, wherein acquiring the dependency form of the application system comprises:
  storing the dependency form of the application system in a non-transitory computer-readable storage medium in advance;
  obtaining the dependency form by means of reading the non-transitory computer-readable storage medium.

6. The method for compatibility detection according to claim 1, wherein acquiring the dependency form of the application system comprises:
  receiving data information sent by an external device, so as to obtain the dependency form.

7. The method for compatibility detection according to claim 1, wherein acquiring the dependency form of the application system comprises:
  analyzing the application system, so as to obtain the dependency form.

8. The method for compatibility detection according to claim 1, respectively performing the compatibility matching detection on the dependency form and each of the dependency libraries, comprises:
  judging whether each dependency in the dependency form has the corresponding dependency package in the dependency library.

9. The method for compatibility detection according to claim 1, wherein dividing, by means of the matching forms, the plurality of the operating systems into the first operating systems which are in dependency compatibility with the application system, and the second operating systems which are not in dependency compatibility with the application system comprises:
  dividing the plurality of the operating systems into the first operating systems and the second operating systems on a basis of dependency compatibility matching situations recorded in the matching forms.

10. The method for compatibility detection according to claim 1, before sorting the plurality of the operating systems in a descending order of numbers of the dependency matching items, the method further comprises:
  setting in advance, the number of the first operating systems.

11. The method for compatibility detection according to claim 1, wherein the method further comprises:
  constructing a compatibility report of the application system, and marking information indicating whether the application system is compatible with each of the plurality of the operating systems.

12. The method for compatibility detection according to claim 1, wherein compatibility coefficients are truncated by the compatibility threshold value, and the compatibility coefficients which are truncated are stored as a list of screened operating systems, all of the operating systems corresponding to all of the compatibility coefficients contained in a list of the operating systems.

13. The method for compatibility detection according to claim 1, wherein the dependency form is used for recording all dependency information of the application system, and the dependency information comprises the name of the dependency, the type of the dependency and a version of the dependency.

14. The method for compatibility detection according to claim 1, wherein dividing, by means of the matching forms, the plurality of the operating systems into the first operating systems which are in dependency compatibility with the application system, and the second operating systems which are not in dependency compatibility with the application system comprises:
  dividing the plurality of the operating systems into the first operating systems which are in dependency compatibility with the application system, and the second operating systems which are not in dependency compatibility with the application system on a basis of number sorting.

15. An electronic device, comprising:
  a memory, used for storing a computer program; and
  a processor, used for implementing steps of the method for compatibility detection according to claim 1 when executing the computer program.

16. A non-transitory computer-readable storage medium, wherein a computer program is stored on the non-transitory computer-readable storage medium, and when executed by a processor, the computer program is configured to cause the processor to:
  acquire a dependency form of an application system and dependency libraries of each of a plurality of operating systems;
  respectively perform compatibility matching detection on the dependency form and each of the dependency libraries, so as to obtain matching forms corresponding to each of the plurality of the operating systems;
  divide, by means of the matching forms, the plurality of the operating systems into first operating systems which are in dependency compatibility with the application system, and second operating systems which are not in dependency compatibility with the application system;
  determine that the application system is not compatible with the second operating system; and
  perform a compatibility white box test on the first operating system, so as to obtain a compatibility result, which indicates whether the application system is compatible with the first operating system, the computer program is configured to cause the processor further to:
count the number of dependency matching items of each of the matching forms; and
divide the plurality of the operating systems into the first operating systems and the second operating systems by means of the number of the dependency matching items, the computer program is configured to cause the processor further to:
divide the number of the dependency matching items by a total number of dependency items of the dependency form, so as to obtain a compatibility coefficient;
determine, to be the first operating system, an operating system of which the compatibility coefficient is greater than a compatibility threshold value; and
determine, to be the second operating system, an operating system of which the compatibility coefficient is not greater than the compatibility threshold value, the computer program is configured to cause the processor further to:
sort the plurality of the operating systems in a descending order of numbers of the dependency matching items; and
determine, to be the first operating systems, a specified number of operating systems at a head of a queue, and determine, to be the second operating systems, operating systems excluding the specified number of the operating systems at the head of the queue.

* * * * *